US011620367B2

(12) United States Patent
Liu et al.

(10) Patent No.: US 11,620,367 B2
(45) Date of Patent: Apr. 4, 2023

(54) KEY SPECIFIC FINGERPRINT BASED ACCESS CONTROL

(71) Applicant: International Business Machines Corporation, Armonk, NY (US)

(72) Inventors: Su Liu, Austin, TX (US); Demetrice Browder, Round Rock, TX (US); Cheng Xu, Beijing (CN); Debbie Anglin, Leander, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 17/091,722

(22) Filed: Nov. 6, 2020

(65) Prior Publication Data

US 2022/0147603 A1 May 12, 2022

(51) Int. Cl.
G06F 21/00 (2013.01)
G06F 21/32 (2013.01)
H04L 9/40 (2022.01)
G06V 40/10 (2022.01)

(52) U.S. Cl.
CPC .............. *G06F 21/32* (2013.01); *G06V 40/10* (2022.01); *H04L 63/0861* (2013.01)

(58) Field of Classification Search
CPC ...... G06F 21/32; G06V 40/10; H04L 63/0861
See application file for complete search history.

(56) References Cited

U.S. PATENT DOCUMENTS

| 6,069,970 | A | 5/2000 | Salatino et al. |
| 9,013,424 | B2 | 4/2015 | Kurz |
| 9,659,164 | B2 | 5/2017 | Krishnamurthi |
| 10,013,163 | B2 | 7/2018 | Schönleben et al. |
| 2013/0265137 | A1 | 10/2013 | Nelson et al. |
| 2015/0178542 | A1 | 6/2015 | Minteer et al. |
| 2015/0319168 | A1 | 11/2015 | McCarty et al. |
| 2016/0034673 | A1 | 2/2016 | Chandra |

(Continued)

FOREIGN PATENT DOCUMENTS

| ES | 2705581 T3 | 3/2019 |
| KR | 20170105262 A | 9/2017 |

OTHER PUBLICATIONS

NPL1, Intellectual Property Office, Application No. GB2114899.4, Combined Search and Examination Report, dated Jul. 19, 2022.

(Continued)

*Primary Examiner* — Jeffrey C Pwu
*Assistant Examiner* — William A Corum, Jr.
(74) *Attorney, Agent, or Firm* — Garg Law Firm, PLLC; Rakesh Garg; Nathan Rau

(57) ABSTRACT

Using a biometric sensor coupled to a touchscreen, fingerprint data is collected from within a plurality of virtual key areas of the touchscreen. A virtual key area in the plurality of virtual key areas comprises an area of the touchscreen configured to display an input prompt and collect touch data responsive to the input prompt. Responsive to determining that the fingerprint data has above a threshold level of similarity with stored fingerprint data associated with each of the virtual key areas and that a sequence of the virtual key areas matches a stored key sequence, access to a protected resource is allowed.

16 Claims, 9 Drawing Sheets

(56) References Cited

U.S. PATENT DOCUMENTS

| | | | |
|---|---|---|---|
| 2016/0063230 A1* | 3/2016 | Alten | G06F 21/32 |
| | | | 726/28 |
| 2016/0253538 A1 | 9/2016 | Lu et al. | |
| 2017/0300682 A1 | 10/2017 | Alten | |
| 2019/0294770 A1 | 9/2019 | Han et al. | |
| 2020/0372142 A1* | 11/2020 | Huang | G06F 21/32 |
| 2022/0147613 A1* | 5/2022 | Anderson | G06F 21/552 |

OTHER PUBLICATIONS

Application No. GB2114899.4, Patents Act 1977: Examination Report under Section 18(3), dated Dec. 16, 2022.

Hasegawa et al., New Directions in Multisensory Authentication, Soups, 2009.

Thubron, Samsung patent shows off full-screen fingerprint scanner, phone with tiny notch, Oct. 22, 2018, https://www.techspot.com/news/77027-samsung-patent-shows-vision-full-screen-fingerprint-scanner.html.

Anmol, Samsung files a patent for Full Screen Fingerprint-On-Display scanner, Oct. 21, 2018, https://mspoweruser.com/samsung-files-a-patent-for-full-screen-fingerprint-on-display-scanner/.

* cited by examiner

KEY SPECIFIC FINGERPRINT BASED ACCESS CONTROL

BACKGROUND

The present invention relates generally to a method, system, and computer program product for fingerprint based access control. More particularly, the present invention relates to a method, system, and computer program product for key specific fingerprint based access control.

An access control system controls access to a protected resource, limiting access only to an authorized user. A protected resource can be software. For example, an access control system might allow access to some software functionality only when a user enters a correct password, or a user name and matching password. A protected resource can also be a physical facility, such as a building, portion of a building, or physical device accessible to or usable by only to those who enter a code on a keypad, have an authorized fingerprint or other biometric data, or use another access control method.

A mobile device typically includes a processor, memory, voice and data communications capability, and a touchscreen. A touchscreen is a display device that also accepts user input via a touch or gesture on a designated portion of the display. In some devices, a touchscreen or portion of a touchscreen also simulates a physical keyboard, with labelled portions of the display, also called virtual key areas, labelled with a letter, number, or symbol that is input to the device when the portion is touched.

To prevent unauthorized use, mobile devices typically include password functionality, in which a user touches a set of virtual key areas in a sequence to enter the password. If the user touches a sequence matching a saved password, the user is allowed access additional device functionality. For example, when the single physical key included in one mobile device is pressed, the device displays a screen including a virtual numeric keypad and prompts a user to enter his or her numeric Personal Identification Number (PIN). Only if the user enters the PIN correctly is access granted to more than a basic set of notifications and emergency capabilities. Another mobile device does not have a physical key, and the PIN entry prompt is triggered when the device detects that it has been picked up. Other mobile devices allow access via a password including letters, numbers, and symbols. Mobile devices often have additional biometric access control functionality, such as using a dedicated fingerprint sensor or a camera-based facial recognition capability.

Devices including a processor, memory, voice and data communications capability, and a touchscreen are also used as access control devices controlling access to a physical protected resource. For example, an access control device might be configured as a virtual keypad controlling a door lock, unlocking the door only upon entry of a preset code on the virtual keypad.

SUMMARY

The illustrative embodiments provide a method, system, and computer program product. An embodiment includes a method that collects, using a biometric sensor coupled to a touchscreen, fingerprint data from within a plurality of virtual key areas of the touchscreen, a virtual key area in the plurality of virtual key areas comprising an area of the touchscreen configured to display an input prompt and collect touch data responsive to the input prompt. An embodiment allows, responsive to determining that the fingerprint data has above a threshold level of similarity with stored fingerprint data associated with each of the virtual key areas and that a sequence of the virtual key areas matches a stored key sequence, access to a protected resource.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
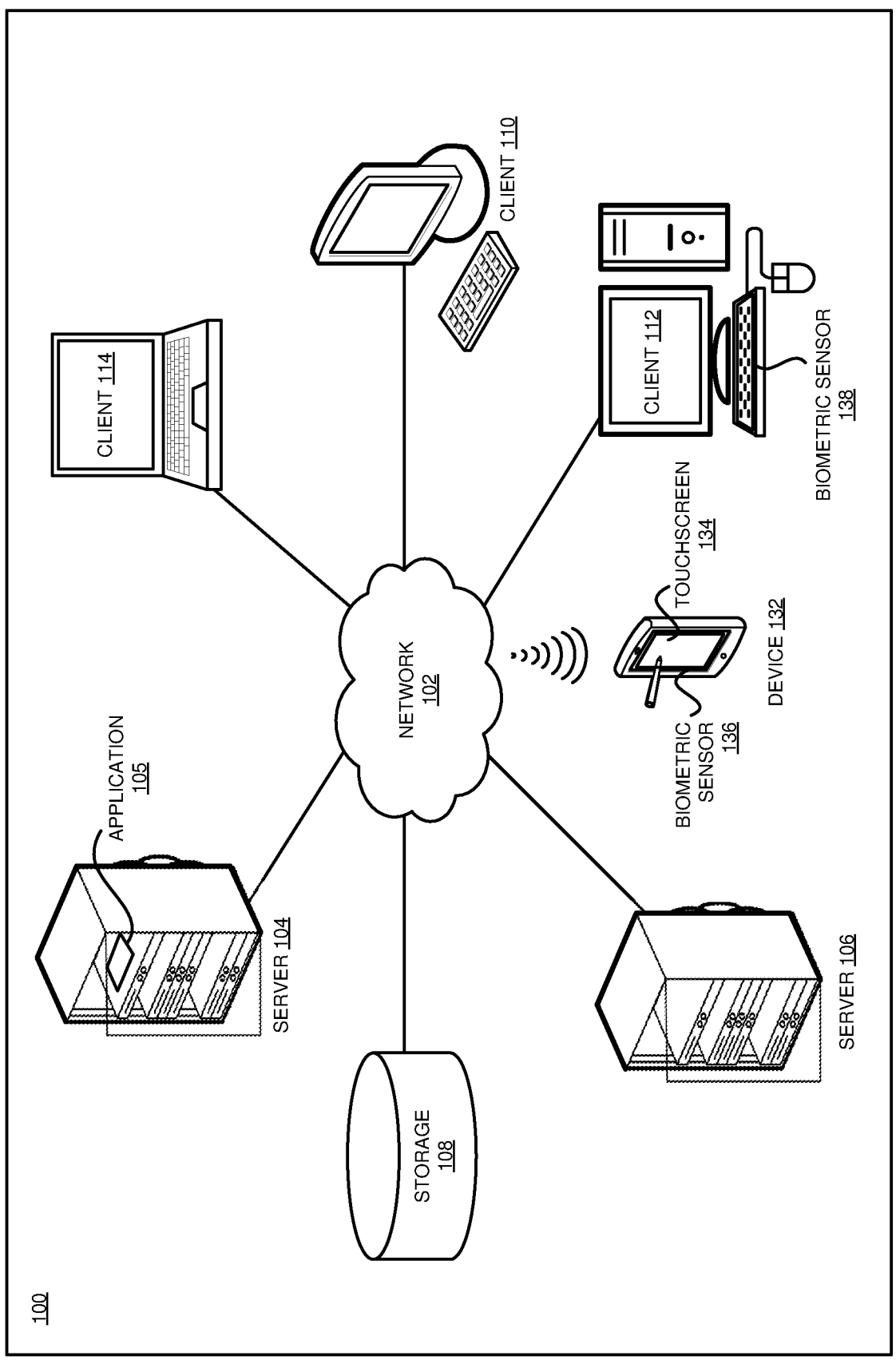
FIG. 1 depicts a block diagram of a network of data processing systems in which illustrative embodiments may be implemented.

The illustrative embodiments recognize that access control systems typically rely on an authorized user having a particular item (e.g., a physical key to a lock, a keycard with a magnetic strip to swipe for access or with a chip that is read for access, or knowledge of a password) or being identified as an authorized user (e.g. with an identification card or biometric information). However, reliance on possession of a particular item still creates security vulnerabilities. For example, an unauthorized user might observe an authorized user entering the correct password, then reuse the same password to gain access. Reliance on identification as an authorized user also creates security vulnerabilities. For example, a child might apply a sleeping parent's finger to a device's fingerprint sensor to gain unauthorized access to the parent's mobile device. Thus, security can be improved by implementing access control based both on having a particular item and being identified as an authorized user.

However, the illustrative embodiments also recognize that a two-step access control process is inconveniently time-consuming. For example, requiring that a user apply a finger to a dedicated fingerprint sensor, then enter a PIN using a touchscreen takes about twice as much time as performing only one of the steps, thus creating a poor user experience for a user accessing a mobile device hundreds of times a day. Thus, the illustrative embodiments recognize that there is a need to combine access control based both on having a particular item and being identified as an authorized user into a single process.

The illustrative embodiments also recognize that, in devices that currently allow access based on biometric access control, such as using a dedicated fingerprint sensor or a camera-based facial recognition capability, these devices still require a user to enter a PIN or password as well, for example at periodic intervals or to access especially protected device functionality such as updating the device's operating system. Further, these devices are subject to the same security vulnerabilities discussed herein. Thus, the illustrative embodiments recognize that, in these devices, there is a need to improve security and simplify the access control process by combining biometric and password-based access control into a single process.

The illustrative embodiments recognize that the presently available tools or solutions do not address these needs or provide adequate solutions for these needs. The illustrative embodiments used to describe the invention generally address and solve the above-described problems and other problems related to key specific fingerprint based access control.

An embodiment can be implemented as a software application. The application implementing an embodiment can be configured as a modification of an access control system, as a separate application that operates in conjunction with an existing access control system, a standalone application, or some combination thereof.

Particularly, some illustrative embodiments provide a method that collects biometric data from within a plurality of virtual key areas of a touchscreen, and determines whether or not the biometric data has above a threshold level of similarity with stored biometric data associated with each of the virtual key areas and that a sequence of the virtual key areas matches a stored key sequence. If both are true, the method allows access to a protected resource; otherwise, the method prevents access to the protected resource.

An embodiment uses a biometric sensor coupled to a touchscreen. A display component of the touchscreen displays one or more virtual key areas, each labelled with a letter, number, or symbol that is input to the device when a data collection surface of the touchscreen is touched, and a second surface of the touchscreen, parallel to the data collection surface, is coupled to a biometric sensor configured to collect fingerprint data. Optical fingerprint sensors that collect fingerprint data using light reflected from a user's finger, using an optical-capacitive technique, and using an ultrasonic technique are all presently known. Additional fingerprint data collection techniques are also possible and contemplated within the scope of the present invention. Thus, when a user's finger touches the data collection surface of the touchscreen, the biometric sensor collects fingerprint data of the user's finger. As well, the touchscreen collects touch data and a processor, executing software, resolves the touch data into data of a single virtual key area touched by the user's finger during fingerprint collection. In one embodiment, the user's finger touching the data collection surface triggers fingerprint data collection. In another embodiment, resolution of the touch data into data of a single virtual key area triggers fingerprint data collection.

Another embodiment uses a set of biometric sensors configured to collect fingerprint data, each coupled to a surface parallel to a data collection surface of a touchscreen. Another embodiment uses a set of biometric sensors, each coupled to a physical key of a keypad. Thus, when a user's finger touches the data collection surface of a touchscreen or physical key, the biometric sensor collects fingerprint data of the user's finger. As well, data is collected of which touchscreen or physical key was touched by the user's finger during fingerprint collection.

Another embodiment uses a biometric sensor configured to collect biometric data that is not fingerprint data. Some non-limiting examples of non-fingerprint biometric data include a portion of a user's hand or foot surface, a portion of a different area of a user's skin, and scan data of an iris or retina. In addition, the biometric data need not be of a human.

An embodiment, in a configuration phase, prompts a user to enter a desired password or PIN. The user enters the password by typing it on physical keys or virtual key areas of the touchscreen, using a desired finger for each key. When, during entry of the desired password, the user touches each key (physical or virtual) with a particular finger, the embodiment collects both fingerprint and key data for each touch. Because fingerprints of each of a user's fingers are different, the resulting stored password includes data of which finger was used to type which key. Thus, one example desired PIN, as entered by a user into a set of virtual key areas labelled as a numeric keypad, might be the sequence 1 (typed with the third finger of the left hand), 2 (typed with the second finger of the left hand, 3 (typed with the index finger of the left hand), and 0 (typed with the thumb of the left hand). Another example desired PIN, as entered by a user into a set of virtual key areas labelled as a numeric keypad, might be the sequence 2 (typed with the second finger of the left hand), 3 (typed with the index finger of the left hand, 5 (typed with the second finger of the left hand), and 6 (typed with the index finger of the left hand). Another example desired password, as entered by a user into a set of virtual key areas labelled as a QWERTY alphanumeric keyboard, might be the sequence a (typed with the fourth finger of the left hand), s (typed with the third finger of the left hand, d (typed with the second finger of the left hand), and f (typed with the index finger of the left hand).

One embodiment rejects a user's desired password if the password, fingering sequence, or the combination of password or fingering sequence is included in a list of passwords deemed too obvious to be used for access control. Another embodiment rejects a user's desired password if the password, fingering sequence, or the combination of password or fingering sequence has been used above a predetermined threshold number of times by other users, indicating that this password is too obvious or may be too easily guessed by others to be used for access control. For example, the PINs 1234 or 0000, because they are often default PINs, might be included in a list of PINs to be rejected. As another example, the sequence asdf, typed with the four fingers of the left hand, might be rejected because fifty other users have already used this sequence, likely because it is easy to type.

Another embodiment, in a configuration phase, prompts a user to enter a desired password or PIN. The user enters the password by typing it on physical keys or virtual key areas of the touchscreen. This embodiment does not require using a desired finger for each key during the configuration phase, instead determining a finger usage pattern for the password. In particular, during multiple entries of the password to access a protected resource, as part of the user's normal usage, the embodiment collects both fingerprint and key data for each touch. While allowing the user access to the protected resource (if the entered password was correct), the embodiment also stores fingerprint data of each finger used to type which key. One embodiment determines, as a usage pattern, that the user has used the same finger (i.e. the collected fingerprint data have above a threshold level of similarity to each other) to type a particular key (physical or virtual) above a threshold number of times. Another embodiment determines, as a usage pattern, that the user has used the same finger (i.e. the collected fingerprint data have above a threshold level of similarity to each other) to type a particular key in above a threshold percentage of all the password entries. Once an embodiment determines a usage pattern, the embodiment switches to requiring that a particular, consistent, finger be used for a corresponding virtual key. One embodiment switches to requiring a particular finger only upon user confirmation. Another embodiment switches to requiring a particular finger without the need for user confirmation. Thus, one example user might set her PIN to 1230. Then, as the user uses the PIN, collected data shows that the user enters the PIN as 1 (typed with the third finger of the left hand), 2 (typed with the second finger of the left hand, 3 (typed with the index finger of the left hand), and 0 (typed with the thumb of the left hand) more than ninety percent of the times the user entered the PIN. As a result, upon user consent the embodiment switches to requiring that this PIN, for this user, be entered using a specific finger for each number in the sequence.

An embodiment stores, as the fingerprint data of a specific finger, a specific fingerprint. Non-limiting examples of a specific fingerprint include the first fingerprint collected, the most recent fingerprint collected when the embodiment determined that a usage pattern existed, and a randomly-selected fingerprint selected from the collected fingerprint data for that fingerprint and virtual key combination. Another embodiment stores, as the fingerprint data of a specific finger, a composite of the collected fingerprint data for that fingerprint and virtual key combination.

Then, once a specific finger, with corresponding fingerprint data, has been associated with a specific physical key or virtual key area, either through configuration or via a usage pattern, an embodiment prompts a user to enter a his or her password or PIN by typing the password, using the configured finger for each key. When, during entry of the desired password, the user touches each key with a particular finger, the embodiment collects both fingerprint and key data for each touch. If the embodiment determines that the collected fingerprint data has above a threshold level of similarity with the user's stored fingerprint data associated with each of the keys and that a sequence of the keys matches the user's stored key sequence, the embodiment allows access to the protected resource. On the other hand, if the embodiment determines that the collected fingerprint data does not have above a threshold level of similarity with the user's stored fingerprint data associated with each of the keys in the stored sequence, the embodiment prevents access to the protected resource.

The manner of access control system described herein is unavailable in the presently available methods in the technological field of endeavor pertaining to biometric-based access control systems. A method of an embodiment described herein, when implemented to execute on a device or data processing system, comprises substantial advancement of the functionality of that device or data processing system in collecting biometric data from within a plurality of virtual key areas of a touchscreen, and determines whether or not the biometric data has above a threshold level of similarity with stored biometric data associated with each of the virtual key areas and that a sequence of the virtual key areas matches a stored key sequence. If both are true, the method allows access to a protected resource; otherwise, the method prevents access to the protected resource.

The illustrative embodiments are described with respect to certain types of biometric data, touch data, passwords, sequences, virtual key areas, thresholds, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
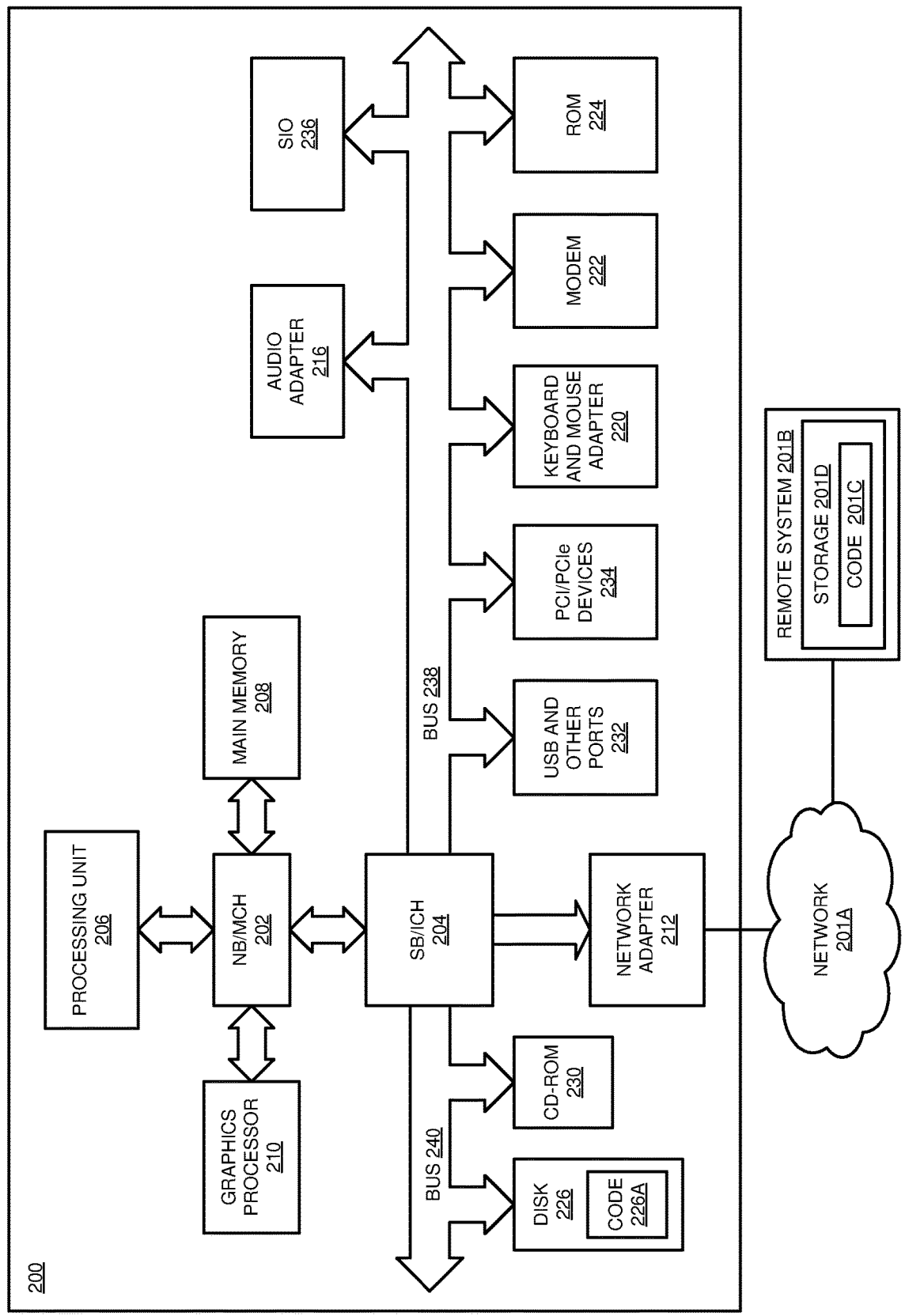
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes touchscreen 134, configured to collect touch data, and biometric sensor 136, configured to collect biometric data. Client 112 also includes biometric sensor 138 coupled to a physical keyboard portion of client 112. Clients 110 and 114 and servers 104 and 106 are also configurable to include a biometric sensor (not shown).

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
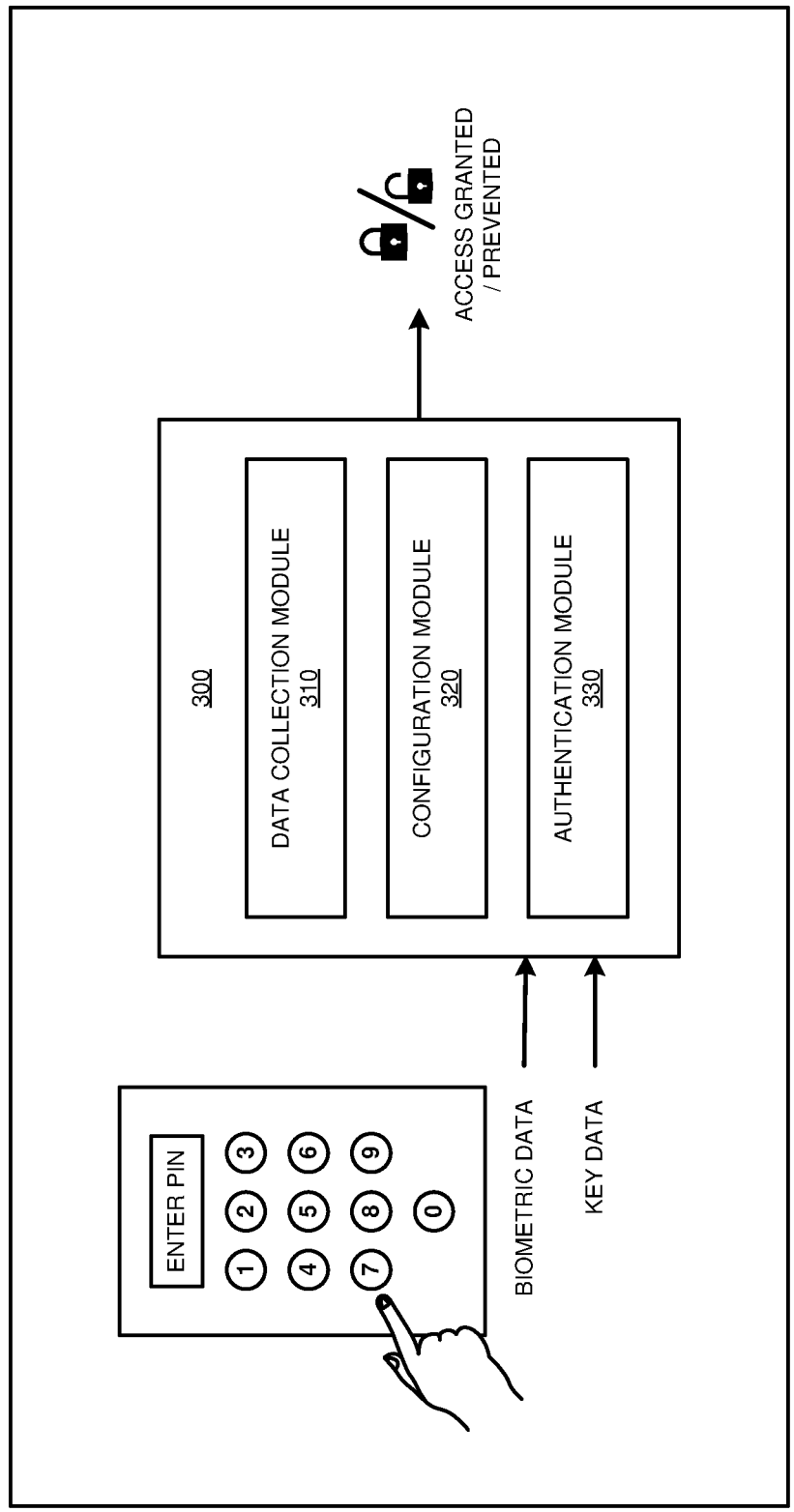
FIG. 3 depicts a block diagram of an example configuration for key specific fingerprint based access control in accordance with an illustrative embodiment.

With reference to FIG. 3, this figure depicts a block diagram of an example configuration for key specific fingerprint based access control in accordance with an illustrative embodiment. Application 300 is an example of application 105 in FIG. 1 and executes in any of servers 104 and 106, clients 110, 112, and 114, and device 132 in FIG. 1.

Data collection module 310 collects biometric data and key data. One implementation of module 310 uses a biometric sensor coupled to a touchscreen. A display component of the touchscreen displays one or more virtual key areas, each labelled with a letter, number, or symbol that is input to the device when a data collection surface of the touchscreen is touched, and a second surface of the touchscreen, parallel to the data collection surface, is coupled to a biometric sensor configured to collect fingerprint data. Thus, when a user's finger touches the data collection surface of the touchscreen, the biometric sensor collects fingerprint data of the user's finger. As well, the touchscreen collects touch data and a processor, executing software, resolves the touch data into data of a single virtual key area touched by the user's finger during fingerprint collection. In one implementation of module 310, the user's finger touching the data collection surface triggers fingerprint data collection. In another implementation of module 310, resolution of the touch data into data of a single virtual key area triggers fingerprint data collection.

Another implementation of module 310 uses a set of biometric sensors configured to collect fingerprint data, each coupled to a surface parallel to a data collection surface of a touchscreen. Another implementation of module 310 uses a set of biometric sensors, each coupled to a physical key of a keypad. Thus, when a user's finger touches the data collection surface of a touchscreen or physical key, the biometric sensor collects fingerprint data of the user's finger. As well, data is collected of which touchscreen or physical key was touched by the user's finger during fingerprint collection.

Another implementation of module 310 uses a biometric sensor configured to collect biometric data that is not fingerprint data. Some non-limiting examples of non-fingerprint biometric data include a portion of a user's hand or foot surface, a portion of a different area of a user's skin, and scan data of an iris or retina. In addition, the biometric data need not be of a human.

Configuration module 320 prompts a user to enter a desired password or PIN. The user enters the password by typing it on physical keys or virtual key areas of the touchscreen, using a desired finger for each key. When, during entry of the desired password, the user touches each key (physical or virtual) with a particular finger, module 310 collects both fingerprint and key data for each touch. Because fingerprints of each of a user's fingers are different, the resulting stored password includes data of which finger was used to type which key. One implementation of module 320 rejects a user's desired password if the password, fingering sequence, or the combination of password or fingering sequence is included in a list of passwords deemed too obvious to be used for access control. Another implementation of module 320 rejects a user's desired password if the password, fingering sequence, or the combination of password or fingering sequence has been used above a predetermined threshold number of times by other users, indicating that this password is too obvious or may be too easily guessed by others to be used for access control.

Another implementation of module 320 prompts a user to enter a desired password or PIN. The user enters the password by typing it on physical keys or virtual key areas of the touchscreen. This implementation of module 320 does not require using a desired finger for each key during the configuration phase, instead determining a finger usage pattern for the password. In particular, during multiple entries of the password to access a protected resource, as part of the user's normal usage, module 310 collects both fingerprint and key data for each touch. While allowing the user access to the protected resource (if the entered password was correct), module 320 also stores fingerprint data of each finger used to type which key. One implementation of module 320 determines, as a usage pattern, that the user has used the same finger (i.e. the collected fingerprint data have above a threshold level of similarity to each other) to type a particular key (physical or virtual) above a threshold number of times. Another implementation of module 320 determines, as a usage pattern, that the user has used the same finger (i.e. the collected fingerprint data have above a threshold level of similarity to each other) to type a particular key in above a threshold percentage of all the password entries. Once module 320 determines a usage pattern, application 300 switches to requiring that a particular, consistent, finger be used for a corresponding virtual key.

Module 320 stores, as the fingerprint data of a specific finger, a specific fingerprint, for example the first fingerprint collected, the most recent fingerprint collected when a usage pattern was determined, and a randomly-selected fingerprint selected from the collected fingerprint data for that fingerprint and virtual key combination. Another implementation of module 320 stores, as the fingerprint data of a specific finger, a composite of the collected fingerprint data for that fingerprint and virtual key combination.

Then, once a specific finger, with corresponding fingerprint data, has been associated with a specific physical key or virtual key area, either through configuration or via a usage pattern, authentication module 330 prompts a user to enter a his or her password or PIN by typing the password, using the configured finger for each key. When, during entry of the desired password, the user touches each key with a particular finger, module 310 collects both fingerprint and key data for each touch. If module 330 determines that the collected fingerprint data has above a threshold level of similarity with the user's stored fingerprint data associated with each of the keys and that a sequence of the keys matches the user's stored key sequence, module 330 allows access to the protected resource. On the other hand, if module 330 determines that the collected fingerprint data does not have above a threshold level of similarity with the user's stored fingerprint data associated with each of the keys in the stored sequence, module 330 prevents access to the protected resource.

Figure 4:
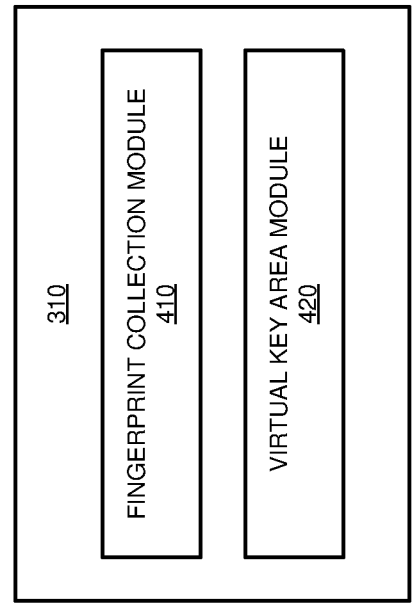
FIG. 4 depicts a block diagram of an example configuration for key specific fingerprint based access control in accordance with an illustrative embodiment.

With reference to FIG. 4, this figure depicts a block diagram of an example configuration for key specific fingerprint based access control in accordance with an illustrative embodiment. In particular, FIG. 4 depicts more detail of module 310 in FIG. 3.

When an implementation of module 310 uses a biometric sensor coupled to a touchscreen, a display component of the touchscreen displays one or more virtual key areas, each labelled with a letter, number, or symbol that is input to the device when a data collection surface of the touchscreen is touched. A second surface of the touchscreen, parallel to the data collection surface, is coupled to a biometric sensor configured to collect fingerprint data. Thus, when a user's finger touches the data collection surface of the touchscreen, fingerprint collection module 410 collects fingerprint data of the user's finger. As well, virtual key area module 420 collects touch data and resolves the touch data into data of a single virtual key area touched by the user's finger during fingerprint collection. In one implementation of module 420, the user's finger touching the data collection surface triggers fingerprint data collection. In another implementation of module 420, resolution of the touch data into data of a single virtual key area triggers fingerprint data collection.

Figure 5:
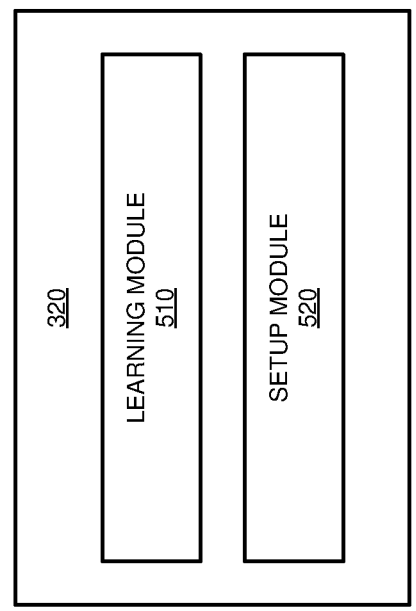
FIG. 5 depicts a block diagram of an example configuration for key specific fingerprint based access control in accordance with an illustrative embodiment.

With reference to FIG. 5, this figure depicts a block diagram of an example configuration for key specific fingerprint based access control in accordance with an illustrative embodiment. In particular, FIG. 5 depicts more detail of module 320 in FIG. 3.

Setup module 520 prompts a user to enter a desired password or PIN. The user enters the password by typing it on physical keys or virtual key areas of the touchscreen, using a desired finger for each key. Because fingerprints of each of a user's fingers are different, the resulting stored password includes data of which finger was used to type which key. One implementation of module 520 rejects a user's desired password if the password, fingering sequence, or the combination of password or fingering sequence is included in a list of passwords deemed too obvious to be used for access control. Another implementation of module 520 rejects a user's desired password if the password, fingering sequence, or the combination of password or fingering sequence has been used above a predetermined threshold number of times by other users, indicating that this password is too obvious or may be too easily guessed by others to be used for access control.

Learning module 510 determines a finger usage pattern for the password. In particular, during multiple entries of the password to access a protected resource, as part of the user's normal usage, module 310 collects both fingerprint and key data for each touch. While allowing the user access to the protected resource (if the entered password was correct), module 510 also stores fingerprint data of each finger used to type which key. One implementation of module 510 determines, as a usage pattern, that the user has used the same finger (i.e. the collected fingerprint data have above a threshold level of similarity to each other) to type a particular key (physical or virtual) above a threshold number of times. Another implementation of module 510 determines, as a usage pattern, that the user has used the same finger (i.e. the collected fingerprint data have above a threshold level of similarity to each other) to type a particular key in above a threshold percentage of all the password entries. Once module 510 determines a usage pattern, application 300 switches to requiring that a particular, consistent, finger be used for a corresponding virtual key.

Figure 6:
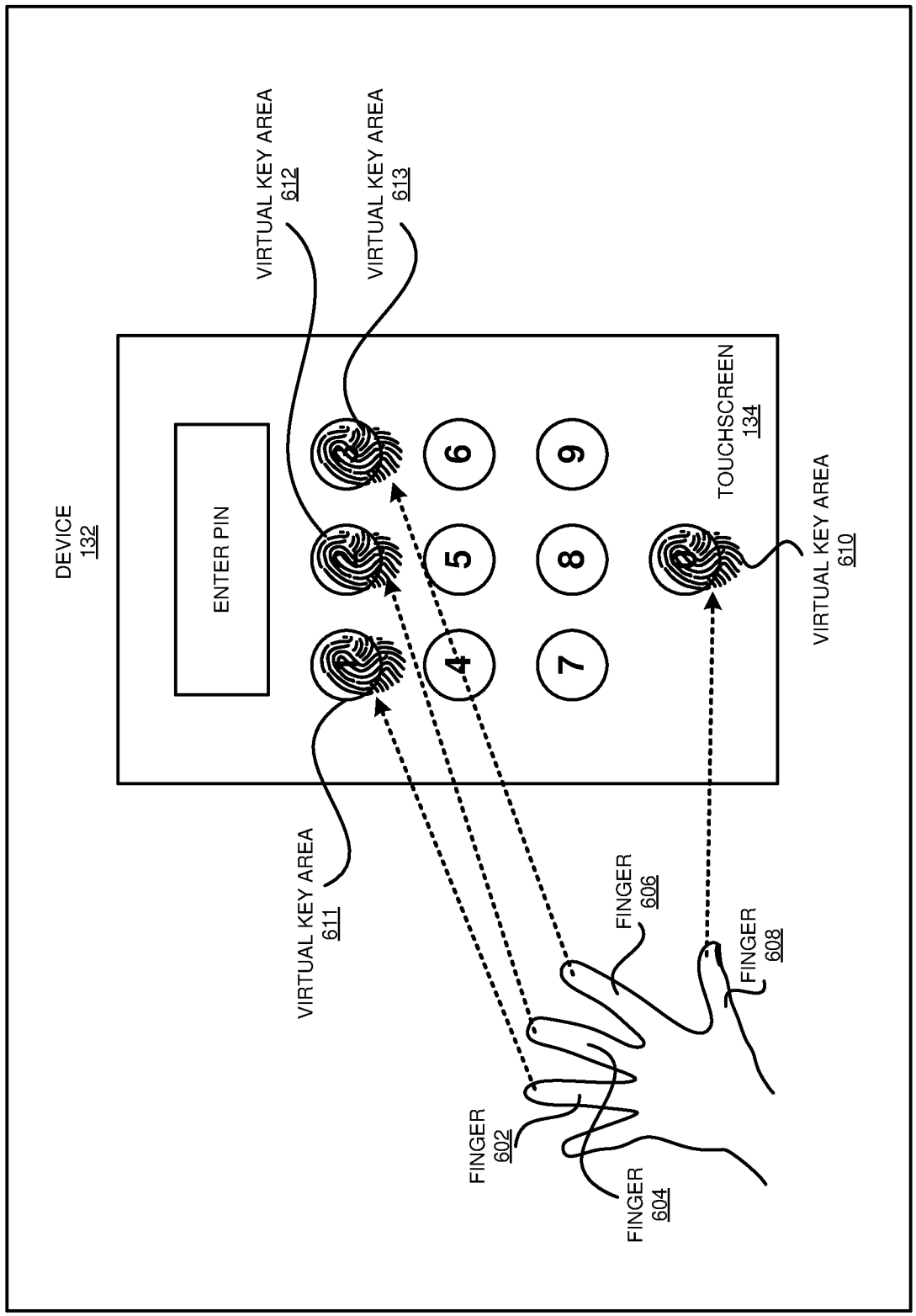
FIG. 6 depicts an example of key specific fingerprint based access control in accordance with an illustrative embodiment.

With reference to FIG. 6, this figure depicts an example of key specific fingerprint based access control in accordance with an illustrative embodiment. The example can be executed using application 300 in FIG. 3. Device 132 and touchscreen 134 are the same as device 132 and touchscreen 134 in FIG. 1.

Device 132 uses a biometric sensor (not shown) coupled to touchscreen 134. A display component of touchscreen 134 displays one or more virtual key areas, each labelled with a letter, number, or symbol that is input to device 132 when a data collection surface of the touchscreen is touched. A second surface of touchscreen 134, parallel to the data collection surface, is coupled to a biometric sensor configured to collect fingerprint data. Thus, when a user's finger touches the data collection surface of touchscreen 134, the biometric sensor collects fingerprint data of the user's finger.

As well, touchscreen 134 collects touch data and a processor, executing software, resolves the touch data into data of a single virtual key area touched by the user's finger during fingerprint collection. Thus, as depicted a user enters his or her PIN by touching virtual key area 611 with finger 602, thus typing "1", touching virtual key area 612 with finger 604, thus typing "2", touching virtual key area 613 with finger 606, thus typing "3", and touching virtual key area 610 with finger 608, thus typing "0". If application 300 determines that the collected fingerprint data has above a threshold level of similarity with the user's stored fingerprint data associated with each of the keys and that the key sequence "1230" matches the user's stored key sequence, application 300 allows access to the protected resource. On the other hand, if application 300 determines that the collected fingerprint data does not have above a threshold level of similarity with the user's stored fingerprint data associated with each of the keys in the stored sequence, the embodiment prevents access to the protected resource.

Figure 7:
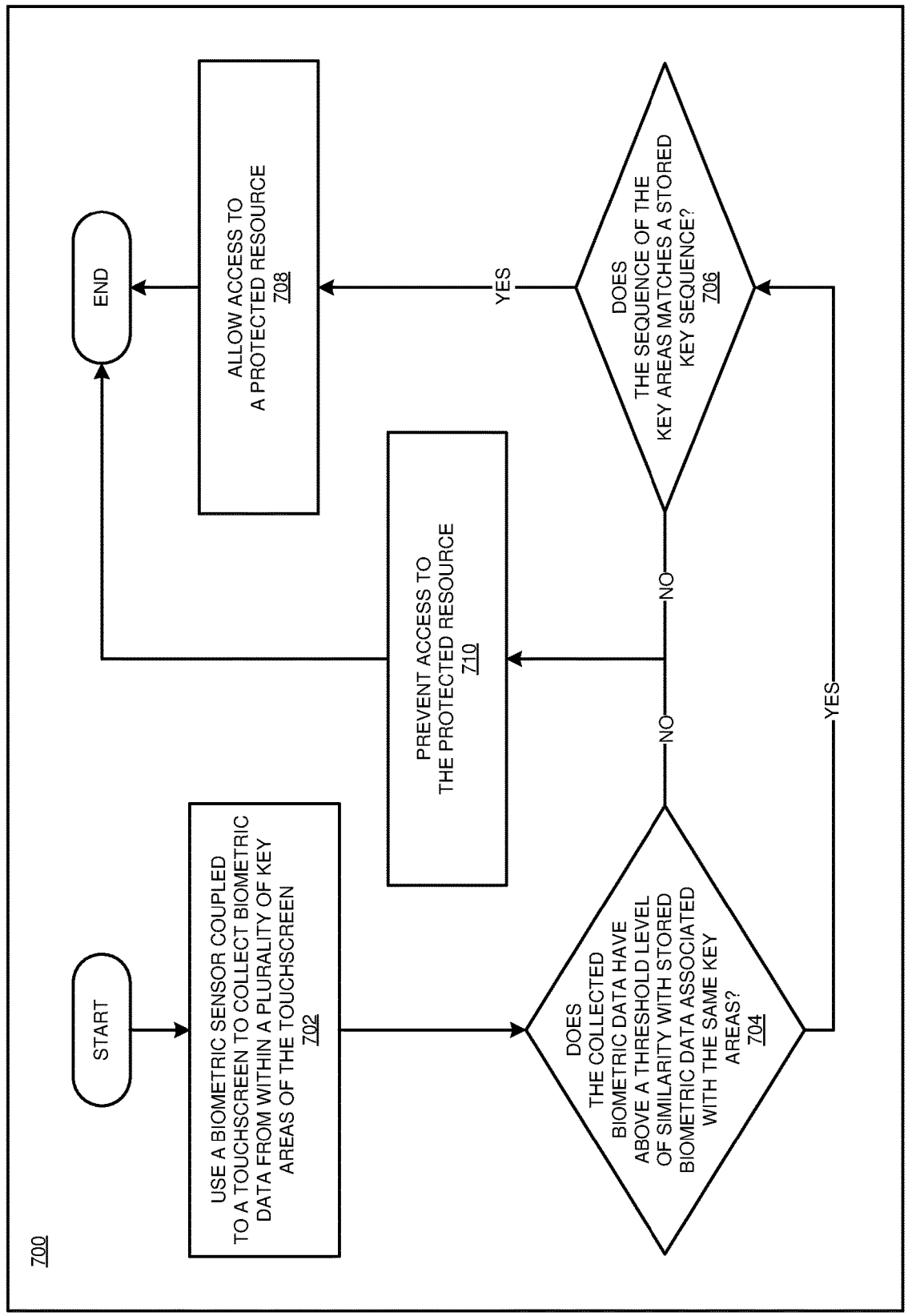
FIG. 7 depicts a flowchart of an example process for key specific fingerprint based access control in accordance with an illustrative embodiment.

With reference to FIG. 7, this figure depicts a flowchart of an example process for key specific fingerprint based access control in accordance with an illustrative embodiment. Process 700 can be implemented in application 300 in FIG. 3.

In block 702, the application uses a biometric sensor coupled to a touchscreen to collect fingerprint data from within a plurality of key areas of the touchscreen. In block 704, the application determines whether or not the collected biometric data has above a threshold level of similarity with stored biometric data associated with the same key areas. If yes ("YES" path of block 704), in block 706 the application determines whether the sequence of the key areas matches a stored key sequence. If yes ("YES" path of block 706), in block 708 the application allows access to a protected resource. Otherwise ("NO" paths of blocks 704 and 706), in block 710 the application prevents access to the protected resource. Then the application ends.

Figure 8:
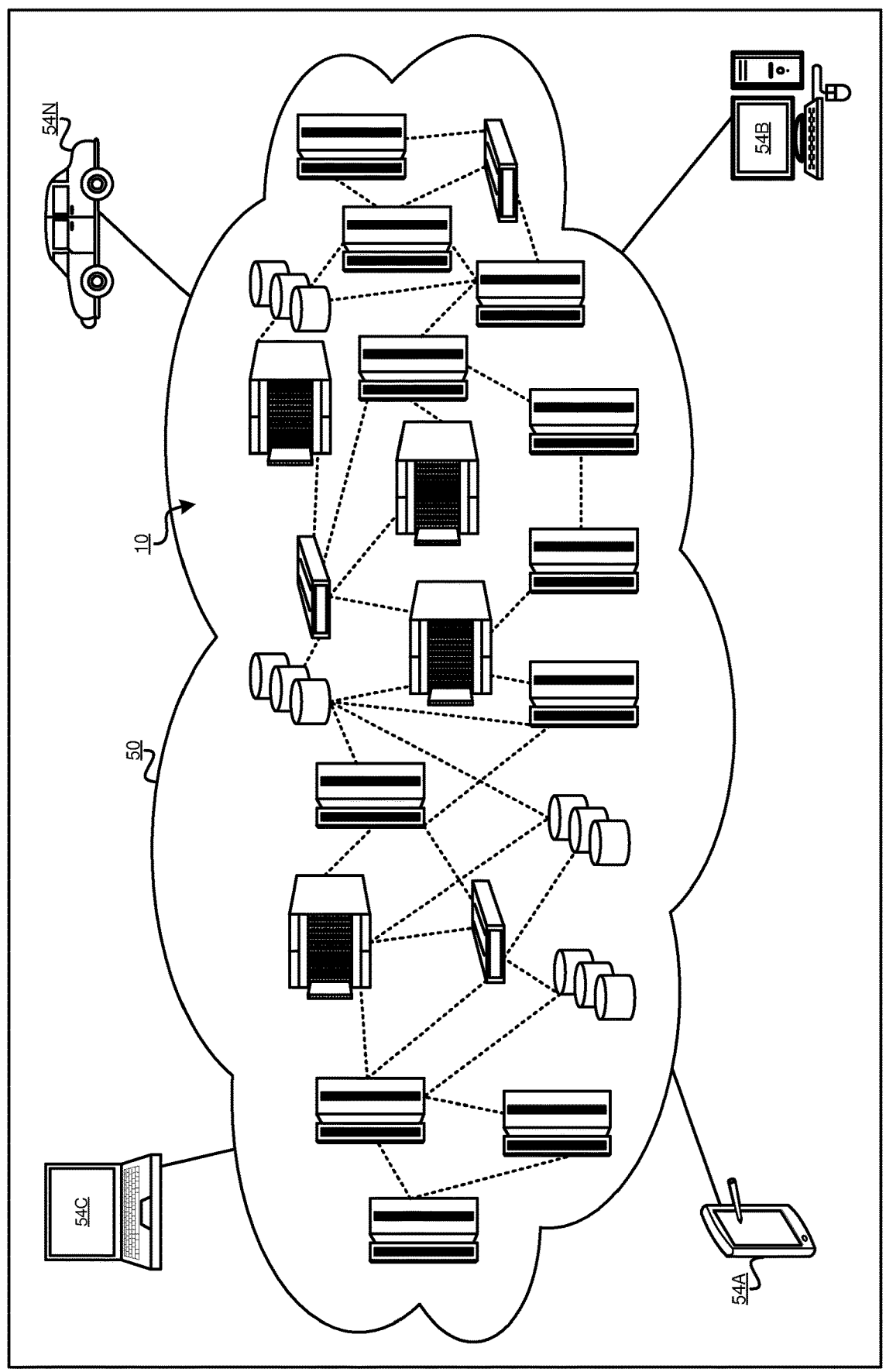
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
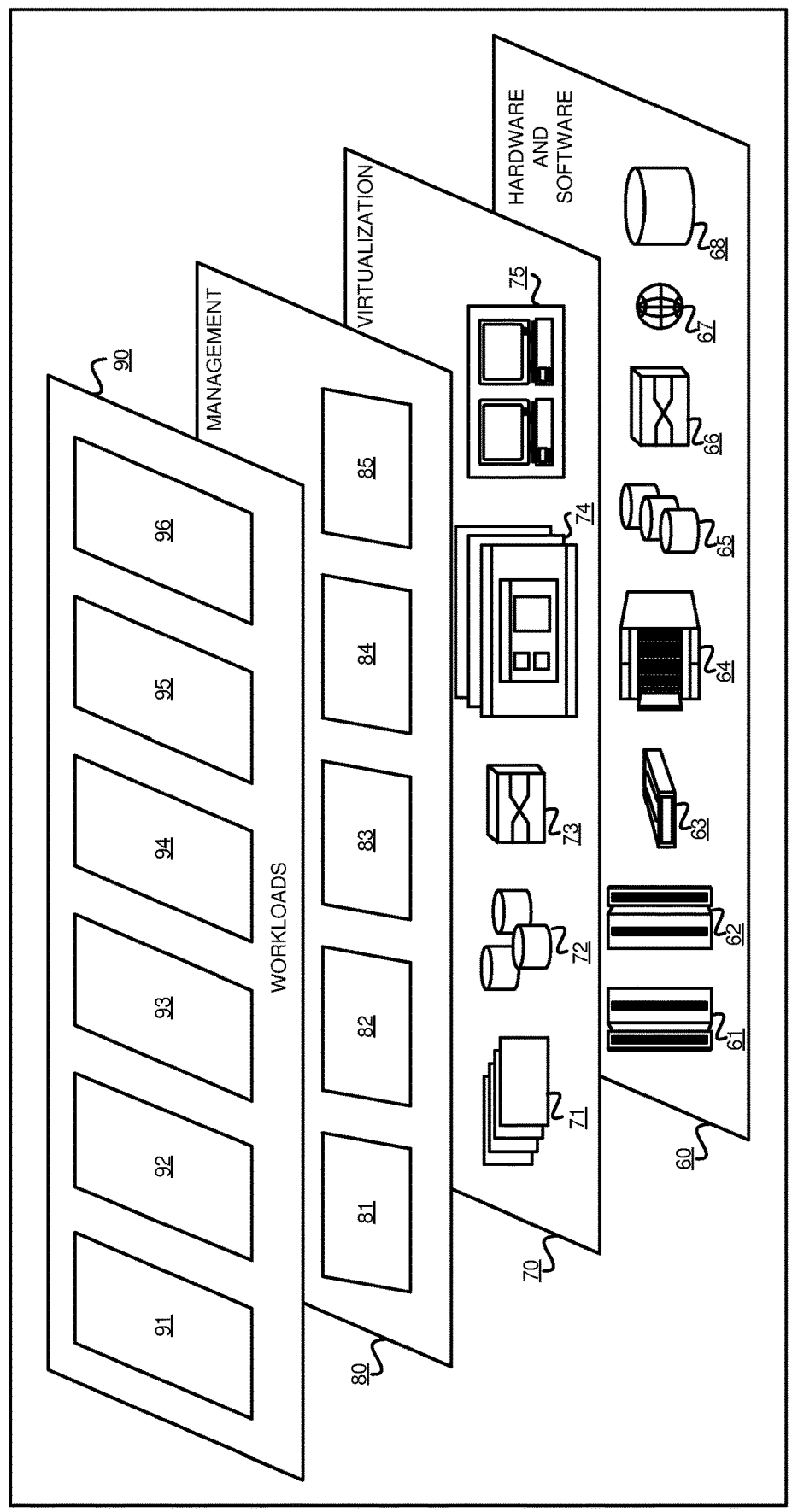
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for key specific fingerprint based access control and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   collecting, during a configuration phase, using a biometric sensor coupled to a touchscreen, first fingerprint data of a first user during a plurality of entries of a password, the plurality of entries of the password allowing access to a protected resource, the first fingerprint data collected from a plurality of virtual key areas of the touchscreen, a virtual key area in the plurality of virtual key areas comprising an area of the touchscreen configured to display an input prompt and collect touch data responsive to the input prompt;

determining, during the configuration phase by analyzing the first fingerprint data, a fingering sequence used in the plurality of entries of the password, the fingering sequence comprising a sequence of uses of specific fingers in specific virtual key areas, above a threshold number of times, when entering the password in order to access the protected resource;

enabling, during the configuration phase responsive to determining that the fingering sequence has been configured to access the protected resource less than a threshold number of times by a plurality of users other than the first user, a requirement to use the fingering sequence during entry of the password, the enabling resulting in exiting the configuration phase, the enabling designating the fingering sequence as a required fingering sequence;

collecting, subsequent to the configuration phase using the biometric sensor coupled to the touchscreen, second fingerprint data from within the plurality of virtual key areas of the touchscreen; and allowing, responsive to determining that a fingering sequence used in entering the second fingerprint data has above a threshold level of similarity with the required fingering sequence and that a sequence of the virtual key areas matches the password, access to the protected resource.

2. The computer-implemented method of claim 1, further comprising:

preventing, responsive to determining that the second fingerprint data does not have above the threshold level of similarity with the stored fingerprint data associated with each of the virtual key areas, access to the protected resource.

3. The computer-implemented method of claim 1, further comprising:

collecting, using the biometric sensor from the plurality of virtual key areas of the touchscreen, a set of training fingerprint data, each member of the set of training fingerprint data associated with a virtual key area in the plurality of virtual key areas; and storing, as stored fingerprint data responsive to determining that members of a subset of the set of training fingerprint data associated with a particular virtual key area have above a threshold level of similarity with each other, the subset, wherein the stored fingerprint data is associated with the particular virtual key area.

4. The computer-implemented method of claim 3, wherein the subset comprises a member of the set of training fingerprint data.

5. The computer-implemented method of claim 3, wherein the subset comprises a composite of a plurality of members of the set of training fingerprint data.

6. The computer-implemented method of claim 1, wherein the collecting is triggered by detecting, within the virtual key area, the touch data.

7. The computer-implemented method of claim 1, wherein the biometric sensor is coupled to a first surface of the touchscreen and the virtual key area comprises a portion of a second surface of the touchscreen configured to display the input prompt and collect the touch data.

8. A computer program product for key specific fingerprint based access control, the computer program product comprising:

one or more computer readable storage media, and program instructions collectively stored on the one or more computer readable storage media, the program instructions comprising:

program instructions to collect, during a configuration phase, using a biometric sensor coupled to a touchscreen, first fingerprint data of a first user during a plurality of entries of a password, the plurality of entries of the password allowing access to a protected resource, the first fingerprint data collected from a plurality of virtual key areas of the touchscreen, a virtual key area in the plurality of virtual key areas comprising an area of the touchscreen configured to display an input prompt and collect touch data responsive to the input prompt;

program instructions to determine, during the configuration phase by analyzing the first fingerprint data, a fingering sequence used in the plurality of entries of the password, the fingering sequence comprising a sequence of uses of specific fingers in specific virtual key areas, above a threshold number of times, when entering the password in order to access the protected resource;

program instructions to enable, during the configuration phase responsive to determining that the fingering sequence has been configured to access the protected resource less than a threshold number of times by a plurality of users other than the first user, a requirement to use the fingering sequence during entry of the password, the enabling resulting in exiting the configuration phase, the enabling designating the fingering sequence as a required fingering sequence;

program instructions to collect, subsequent to the configuration phase using the biometric sensor coupled to the touchscreen, second fingerprint data from within the plurality of virtual key areas of the touchscreen; and program instructions to allow, responsive to determining that a fingering sequence used in entering the second fingerprint data has above a threshold level of similarity with the required fingering and that a sequence of the virtual key areas matches the password, access to the protected resource.

9. The computer program product of claim 8, further comprising:

program instructions to prevent, responsive to determining that the second fingerprint data does not have above the threshold level of similarity with the stored fingerprint data associated with each of the virtual key areas, access to the protected resource.

10. The computer program product of claim 8, further comprising:

program instructions to collect, using the biometric sensor from the plurality of virtual key areas of the touchscreen, a set of training fingerprint data, each member of the set of training fingerprint data associated with a virtual key area in the plurality of virtual key areas; and program instructions to store, as stored fingerprint data responsive to determining that members of a subset of the set of training fingerprint data associated with a particular virtual key area have above a threshold level of similarity with each other, the subset, wherein the stored fingerprint data is associated with the particular virtual key area.

11. The computer program product of claim 10, wherein the subset comprises a member of the set of training fingerprint data.

12. The computer program product of claim 10, wherein the subset comprises a composite of a plurality of members of the set of training fingerprint data.

13. The computer program product of claim 8, wherein the stored program instructions are stored in the at least one of the one or more storage media of a local data processing system, and wherein the stored program instructions are transferred over a network from a remote data processing system.

14. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 8, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to collect, during a configuration phase, using a biometric sensor coupled to a touchscreen, first fingerprint data of a first user during a plurality of entries of a password, the plurality of entries of the password allowing access to a protected resource, the first fingerprint data collected from a plurality of virtual key areas of the touchscreen, a virtual key area in the plurality of virtual key areas comprising an area of the touchscreen configured to display an input prompt and collect touch data responsive to the input prompt;

program instructions to determine, during the configuration phase by analyzing the first fingerprint data, a fingering sequence used in the plurality of entries of the password, the fingering sequence comprising a sequence of uses of specific fingers in specific virtual key areas, above a threshold number of times, when entering the password in order to access the protected resource;

program instructions to enable, during the configuration phase responsive to determining that the fingering sequence has been configured to access the protected resource less than a threshold number of times by a plurality of users other than the first user, a requirement to use the fingering sequence during entry of the password, the enabling resulting in exiting the configuration phase, the enabling designating the fingering sequence as a required fingering sequence;

program instructions to collect, subsequent to the configuration phase using the biometric sensor coupled to the touchscreen, second fingerprint data from within the plurality of virtual key areas of the touchscreen; and program instructions to allow, responsive to determining that a fingering sequence used in entering the second fingerprint data has above a threshold level of similarity with the required fingering sequence and that a sequence of the virtual key areas matches the password, access to the protected resource.

\* \* \* \* \*